United States Patent
McGargill et al.

(10) Patent No.: US 11,172,612 B2
(45) Date of Patent: Nov. 16, 2021

(54) AGRICULTURAL MACHINE ATTACHMENT FOR CORN STALK FLATTENING

(71) Applicant: DK AG Solutions LLC, Randolph, IA (US)

(72) Inventors: David L. McGargill, Randolph, IA (US); Kenneth J. McGargill, Randolph, IA (US)

(73) Assignee: DK AG Solutions LLC, Randolph, IA (US)

( * ) Notice: Subject to any disclaimer, the term of this patent is extended or adjusted under 35 U.S.C. 154(b) by 0 days.

(21) Appl. No.: 16/280,321

(22) Filed: Feb. 20, 2019

(65) Prior Publication Data

US 2019/0254230 A1 Aug. 22, 2019

Related U.S. Application Data

(60) Provisional application No. 62/632,915, filed on Feb. 20, 2018.

(51) Int. Cl.
| | | |
|---|---|---|
| A01D 34/835 | (2006.01) | |
| A01D 45/02 | (2006.01) | |
| A01B 61/04 | (2006.01) | |
| A01D 75/00 | (2006.01) | |

(52) U.S. Cl.
CPC ........ *A01D 34/8355* (2013.01); *A01B 61/046* (2013.01); *A01D 45/02* (2013.01); *A01D 45/021* (2013.01); *A01D 75/00* (2013.01)

(58) Field of Classification Search
CPC .. A01D 34/8355; A01D 45/021; A01D 82/00; A01D 45/02; A01D 75/00; A01B 61/046; A01B 61/044; A01B 61/042; A01B 61/04; A01B 17/004
See application file for complete search history.

(56) References Cited

U.S. PATENT DOCUMENTS 2,038,234 A * 4/1936 Olen .................. B62D 25/188
280/851
2,814,174 A 11/1957 Zimmer
(Continued)

FOREIGN PATENT DOCUMENTS

| DE | 102013004438 B3 * | 3/2014 | ........... A01D 45/021 |
| DE | 202015106171 U1 * | 2/2016 | ......... A01D 34/8355 |
| WO | 2014139496 A1 | 9/2014 | |

OTHER PUBLICATIONS

U.S. Pat. No. 372,735, entitled "Stalk Knocker", issued Nov. 8, 1887 to W.A. Allen.

*Primary Examiner* — Alicia Torres
*Assistant Examiner* — Madeline Ivy Runco
(74) *Attorney, Agent, or Firm* — Merchant & Gould P.C.

(57) ABSTRACT

An attachment of a harvesting head of a combine is disclosed. The attachment includes a main body and a flange fixedly connected to the main body. The flange is connected to the main body at an angle and the flange has at least one mounting aperture. The flange is configured to be attached to the harvesting head of a combine by the at least one mounting aperture. When the flange is attached to the harvesting head of the combine and the combine is performing a harvesting operation, a furthest portion of the main body away from the flange is positioned above a lowest portion of the harvesting head from a ground surface.

20 Claims, 18 Drawing Sheets

(56) References Cited

U.S. PATENT DOCUMENTS

| | | | |
|---|---|---|---|
| 3,027,701 A * | 4/1962 | Campbell | A01D 75/20 56/157 |
| 3,238,709 A | 3/1966 | Williams | |
| 3,306,015 A * | 2/1967 | Myers | A01D 75/20 56/12.7 |
| 3,524,307 A * | 8/1970 | Dahl | A01D 34/828 56/17.4 |
| 3,747,311 A | 7/1973 | DeCoene et al. | |
| 3,802,172 A * | 4/1974 | Mathews | A01D 67/005 56/15.8 |
| 3,808,783 A | 5/1974 | Sutherland et al. | |
| 3,925,971 A | 12/1975 | Goering et al. | |
| 4,085,570 A * | 4/1978 | Joray | A01D 43/00 56/12.7 |
| 4,144,698 A * | 3/1979 | Shelton | A01D 65/08 56/1 |
| 4,149,361 A | 4/1979 | Pauletti et al. | |
| 4,697,645 A * | 10/1987 | Jiskoot | A01B 39/26 172/510 |
| 4,835,954 A | 6/1989 | Enzmann | |
| 5,040,616 A * | 8/1991 | Hake | A01B 61/042 172/271 |
| 5,279,100 A * | 1/1994 | Pruitt | A01D 75/20 160/349.1 |
| 5,405,292 A * | 4/1995 | McConnell | A01D 75/18 460/119 |
| 5,725,057 A | 3/1998 | Taylor | |
| 6,539,697 B2 | 4/2003 | Burk | |
| 6,648,078 B1 | 11/2003 | Moffett et al. | |
| 7,401,528 B2 * | 7/2008 | Deppermann | A01G 7/00 56/10.2 R |
| 7,644,567 B2 * | 1/2010 | Blakeslee | A01D 41/14 56/17.3 |
| 7,647,753 B2 * | 1/2010 | Schlipf | A01D 41/141 56/10.2 E |
| 7,658,058 B2 * | 2/2010 | Pierson | A01D 41/14 56/119 |
| 7,814,737 B2 * | 10/2010 | Pierson | A01D 41/1243 56/119 |
| 8,171,707 B2 | 5/2012 | Kitchel | |
| 8,348,292 B2 | 1/2013 | Meakins | |
| 8,418,432 B2 * | 4/2013 | Shoup | A01B 39/22 56/10.2 E |
| 8,567,167 B2 | 10/2013 | Shoup | |
| 8,667,769 B2 * | 3/2014 | Pierson | A01D 45/02 56/119 |
| 8,806,846 B2 | 8/2014 | Hyronimus et al. | |
| 8,979,106 B2 | 3/2015 | Benoit et al. | |
| D742,938 S * | 11/2015 | Benoit | D15/28 |
| 9,284,000 B1 * | 3/2016 | Smith | B62D 25/188 |
| 9,730,374 B2 | 8/2017 | Wick | |
| 9,743,587 B2 * | 8/2017 | Lohrentz | A01D 45/021 |
| 10,159,189 B2 * | 12/2018 | Shane | A01D 34/44 |
| 10,231,379 B2 * | 3/2019 | Lohrentz | A01D 45/021 |
| 10,398,080 B2 * | 9/2019 | Weitenberg | A01D 34/71 |
| 2002/0112461 A1 | 8/2002 | Burk | |
| 2011/0260425 A1 * | 10/2011 | Meakins | A01D 75/18 280/160 |
| 2013/0019581 A1 * | 1/2013 | Hyronimus | A01B 61/046 56/314 |
| 2013/0020101 A1 * | 1/2013 | Shoup | A01B 61/046 172/763 |
| 2013/0061569 A1 | 3/2013 | McClenathen | |
| 2013/0174529 A1 | 7/2013 | Hyronimus et al. | |
| 2013/0177348 A1 | 7/2013 | Hyronimus et al. | |
| 2013/0192857 A1 * | 8/2013 | Shoup | A01D 75/187 172/833 |
| 2015/0096773 A1 | 4/2015 | Miller et al. | |
| 2015/0201544 A1 | 7/2015 | Wick | |
| 2015/0250098 A1 | 9/2015 | Vandeven et al. | |
| 2016/0014963 A1 | 1/2016 | Totten et al. | |

* cited by examiner

FIG. 8A
FIG. 8B
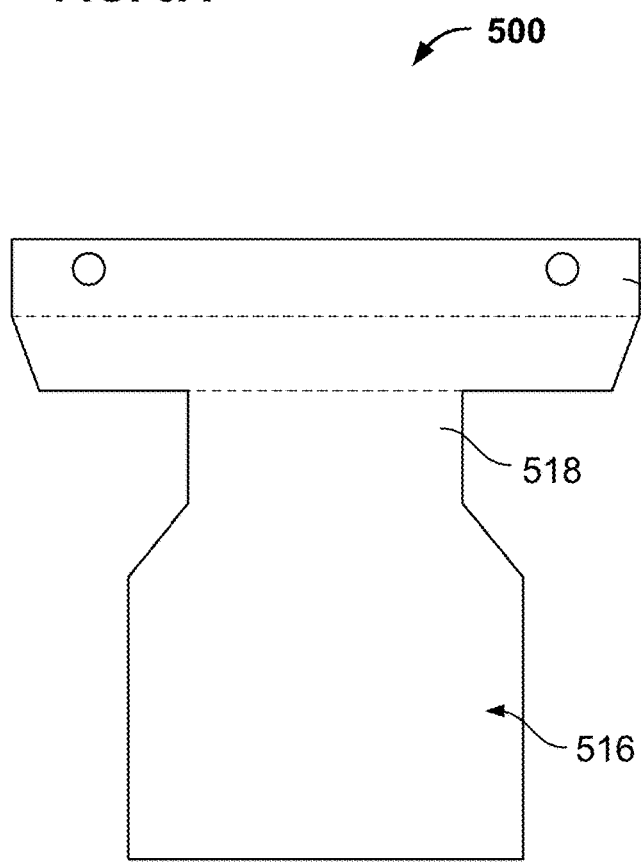
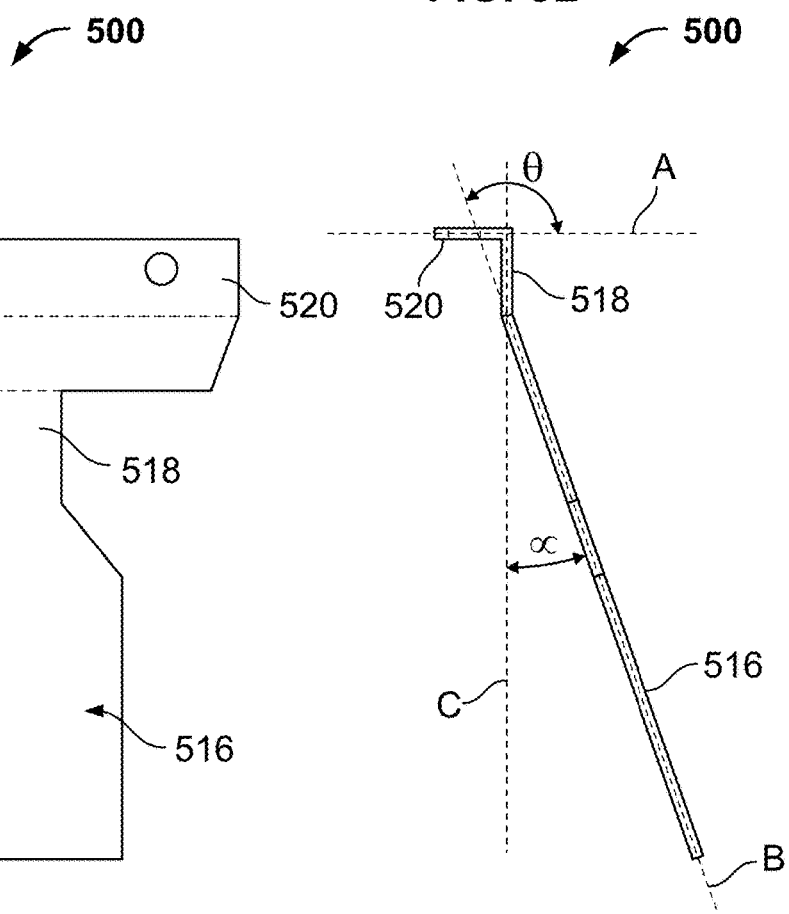

AGRICULTURAL MACHINE ATTACHMENT FOR CORN STALK FLATTENING

CROSS REFERENCE TO RELATED APPLICATION

The present patent application claims the benefit of U.S. Provisional Patent Application Ser. No. 62/632,915, filed Feb. 20, 2018, which patent application is hereby incorporated by reference in its entirety.

BACKGROUND

Present-day corn varieties are producing much stronger stalks, which are more resistant to deterioration than in years past. These resilient stalks are causing wear and damage to equipment (e.g., combines, tractors, etc.) that is used in the field during and after harvest. Specifically, tire damage is especially prevalent, often forcing operators to replace tires more quickly due to wear.

Efforts have been made to attempt to remedy this problem, but current solutions are costly and not user friendly. Often harvesting heads are removed from combines and placed on a trailer for transport to/from the field. There is a need for a product that can be attached to the harvesting head to knock over corn stalks and also facilitate the loading of the harvesting head onto a trailer without having to manipulate the position of the product.

SUMMARY

The present disclosure relates generally to an attachment for a crop harvesting machine, such as a combine. In one possible configuration, and by a non-limiting example, a plate that is attachable to a toolbar of a harvesting head of a combine is disclosed. The plate is configured to knock over cornstalks in the field to reduce damage to harvesting equipment, specifically combine tires.

In one aspect of the present disclosure, an attachment of a harvesting head of a combine is disclosed. The attachment includes a main body and a flange fixedly connected to the main body. The flange is connected to the main body at an angle and the flange has at least one mounting aperture. The flange is configured to be attached to the harvesting head of a combine by the at least one mounting aperture. When the flange is attached to the harvesting head of the combine and the combine is performing a harvesting operation, a furthest portion of the main body away from the flange is positioned above a lowest portion of the harvesting head from a ground surface.

In another aspect of the present disclosure, an attachment of a harvesting head of a combine is disclosed. The attachment includes a main body that has a minimum width and is configured to contact a corn stalk at a first side. The attachment includes a flange connected at an angle to the main body via a neck. The flange, neck, and main body are also in a fixed, rigid relationship. The neck has a minimum width that is less than the minimum width of the main body and the neck tapers to the width of the main body. The neck has a minimum width between 5.0 inches and 6.0 inches. The attachment includes at least one mounting aperture defined by the flange. The at least one mounting aperture is configured to mount the attachment to the harvesting head of the combine.

In another aspect of the present disclosure, a method of operating a harvesting head of a combine is disclosed. The method includes mounting a plurality of attachments in a row to the harvesting head of the combine. Each of the attachments include a main body that has a minimum width and a flange connected to the main body via a neck. The flange, neck and main body are in a fixed, rigid relationship, and the flange is positioned at an angle to the main body. The neck has a minimum width that is less than the minimum width of the main body and the neck tapers to the width of the main body. The flange has at least one mounting aperture and the flange is configured to be attached to the harvesting head of a combine. The method includes operating the harvesting head of the combine where a furthest portion of the main body away from the flange is positioned above a lowest portion of the harvesting head toward a ground surface. The method includes contacting, at least partially, a severed corn stalk with the attachment to a harvesting operation of the harvesting head.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 8A shows a front view of an agricultural machine attachment, according to one embodiment of the present disclosure.

FIG. 8B shows a side view of the agricultural machine attachment of FIG. 8A.

Corresponding reference characters indicate corresponding parts throughout the several views. The exemplifications set out herein illustrate an embodiment of the invention, and such exemplifications are not to be construed as limiting the scope of the invention in any manner.

DETAILED DESCRIPTION

Figure 1:
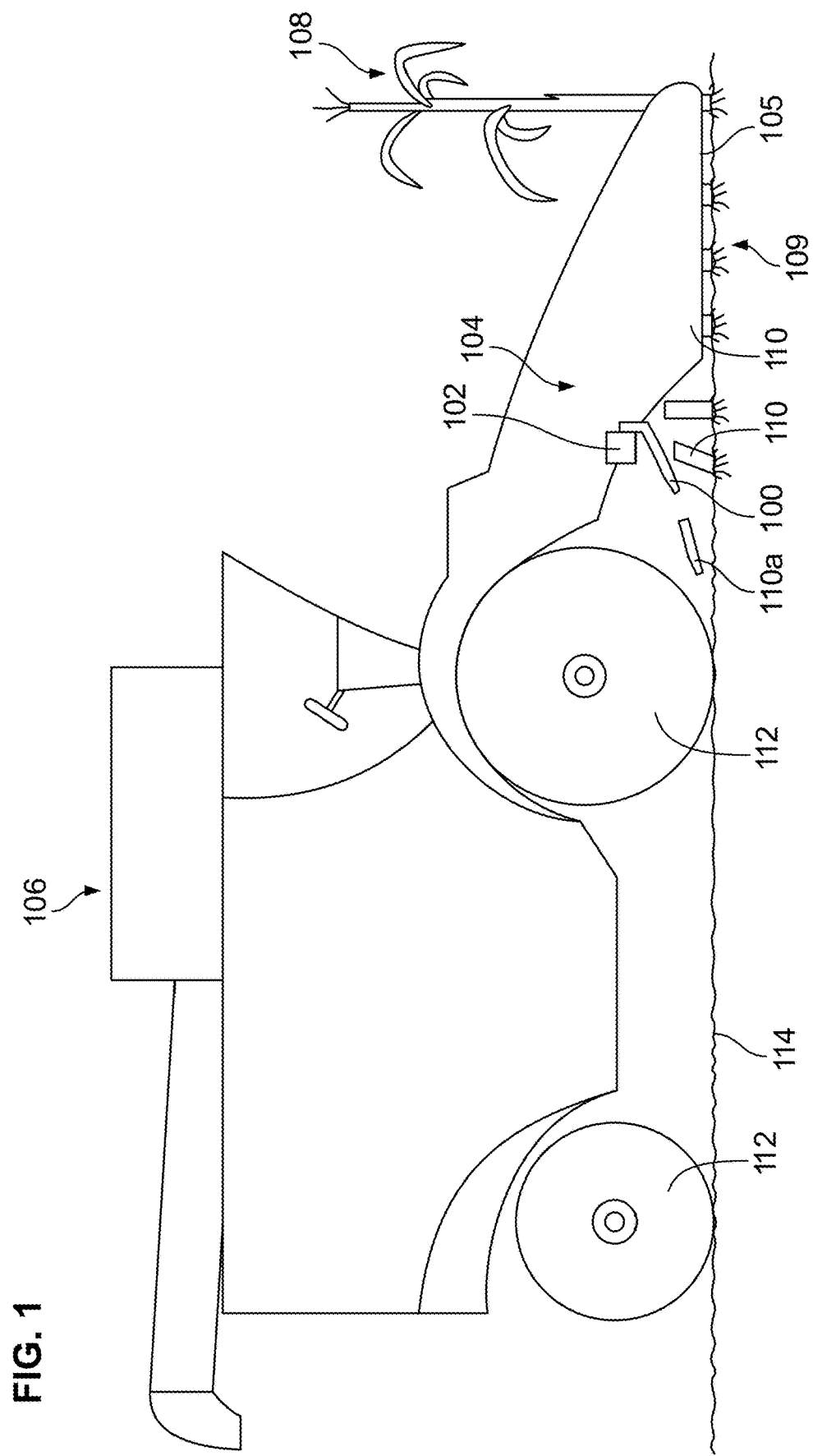
FIG. 1 shows a schematic example of a combine with an agricultural machine attachment, according to one embodiment of the present disclosure.
Figure 2:
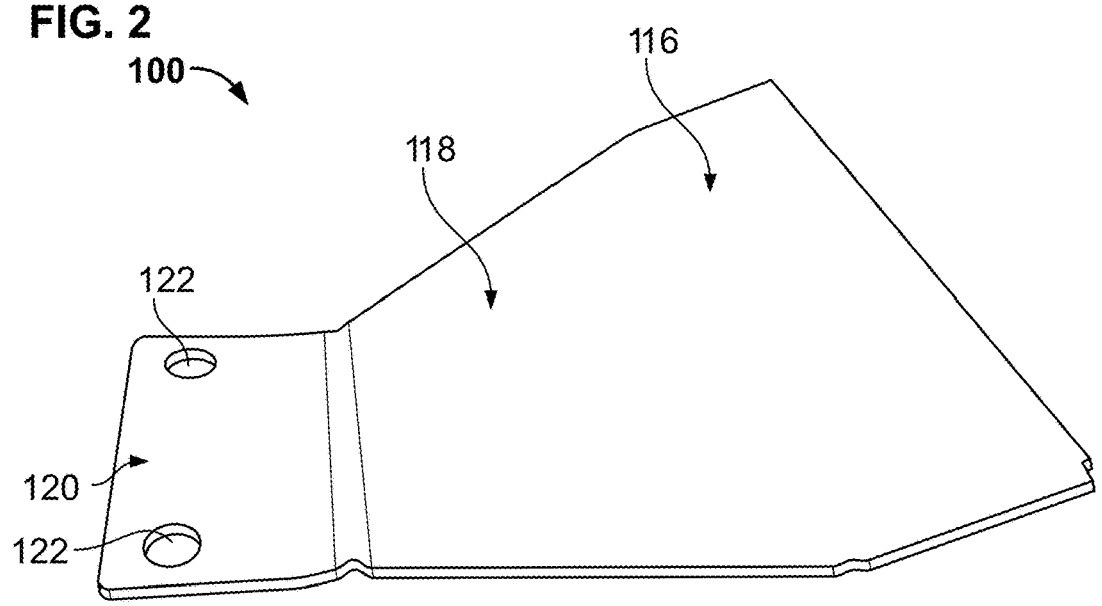
FIG. 2 shows a perspective view of an agricultural machine attachment, according to one embodiment of the present disclosure.
Figure 3:
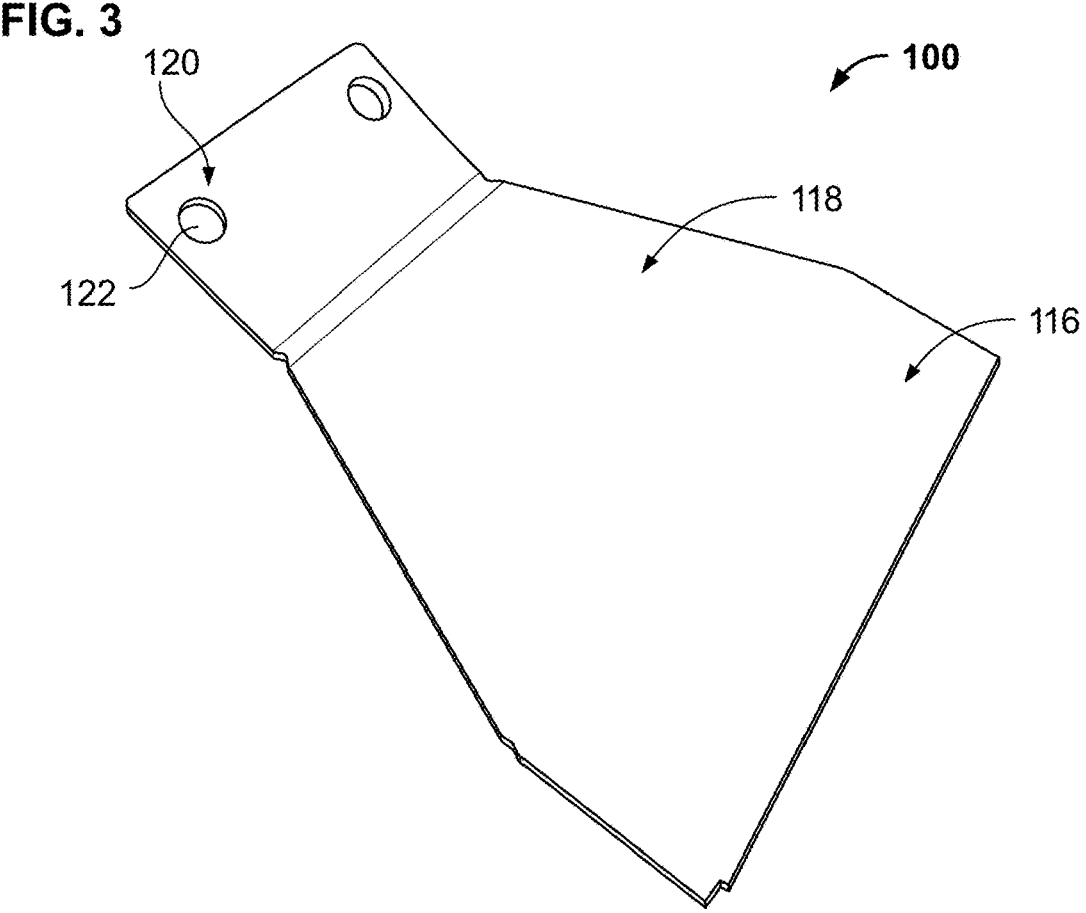
FIG. 3 shows another perspective view of the agricultural machine attachment of FIG. 2.
Figure 4A:
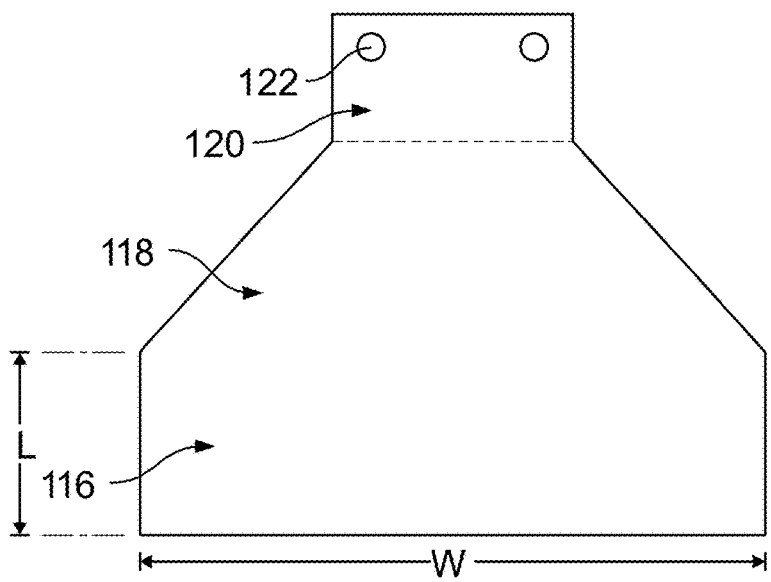
FIG. 4A shows a front view of the agricultural machine attachment of FIG. 2.
Figure 4B:
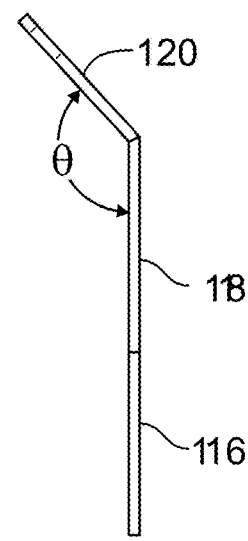
FIG. 4B shows a side view of the agricultural machine attachment of FIG. 2.
Figure 5A:
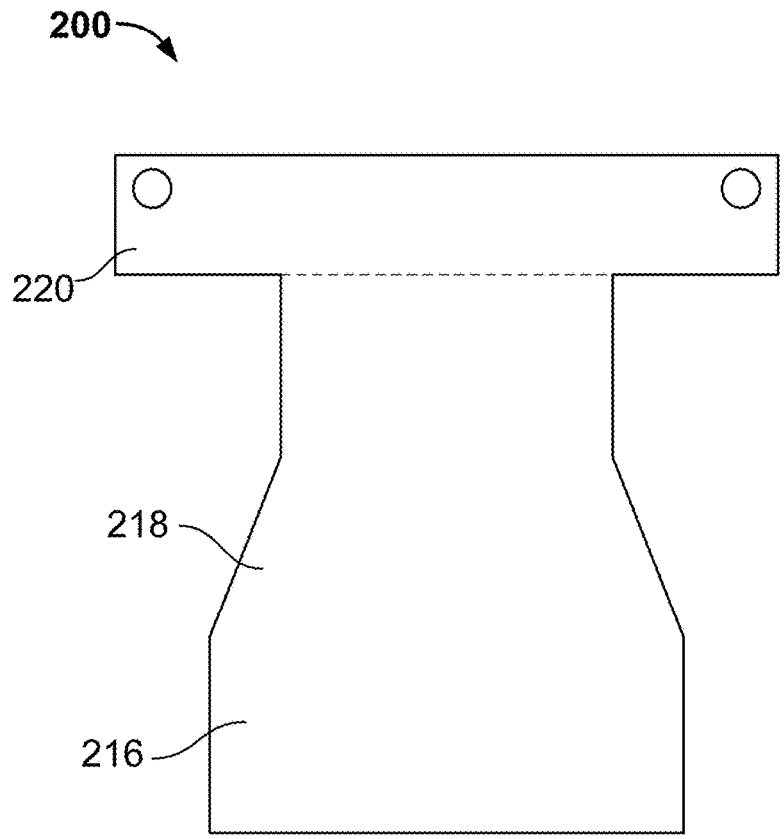
FIG. 5A shows a front view of an agricultural machine attachment, according to one embodiment of the present disclosure.
Figure 5B:
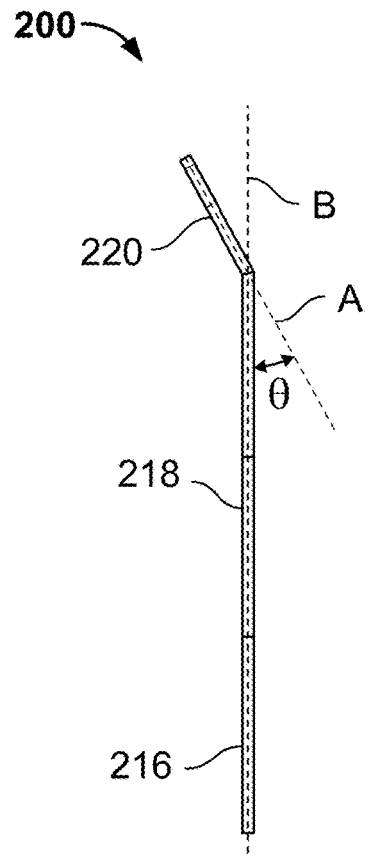
FIG. 5B shows a side view of the agricultural machine attachment of FIG. 5A.
Figure 6A:
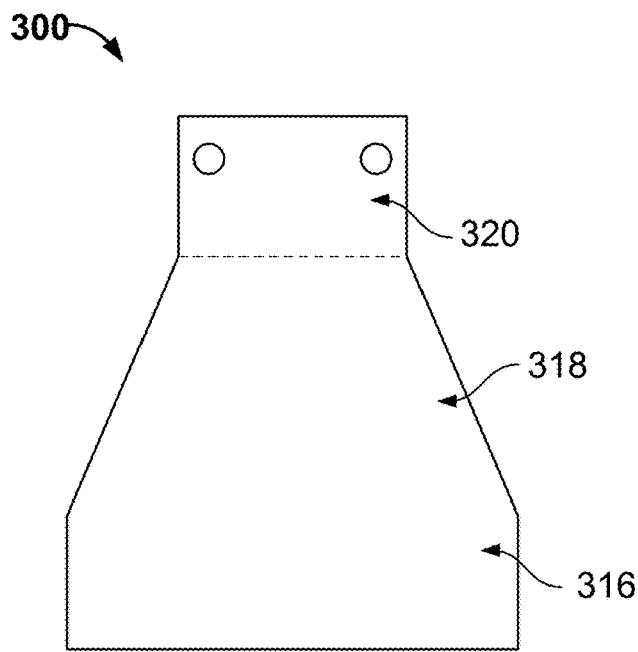
FIG. 6A shows a front view of an agricultural machine attachment, according to one embodiment of the present disclosure.
Figure 6B:
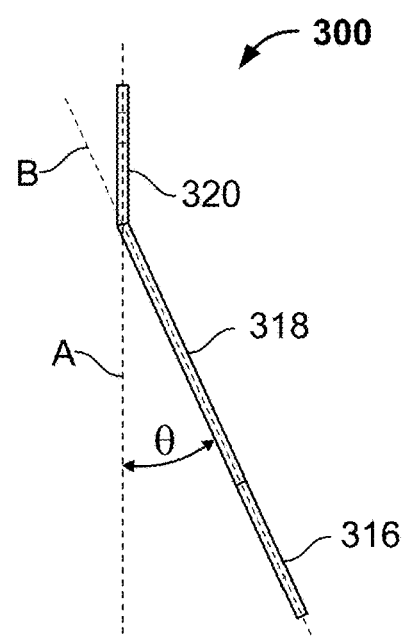
FIG. 6B shows a side view of the agricultural machine attachment of FIG. 6A.
Figure 7A:
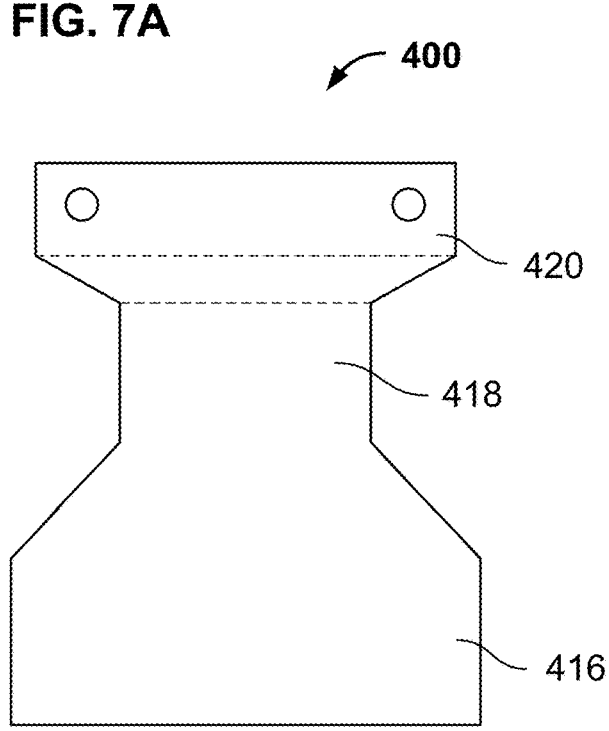
FIG. 7A shows a front view of an agricultural machine attachment, according to one embodiment of the present disclosure.
Figure 7B:
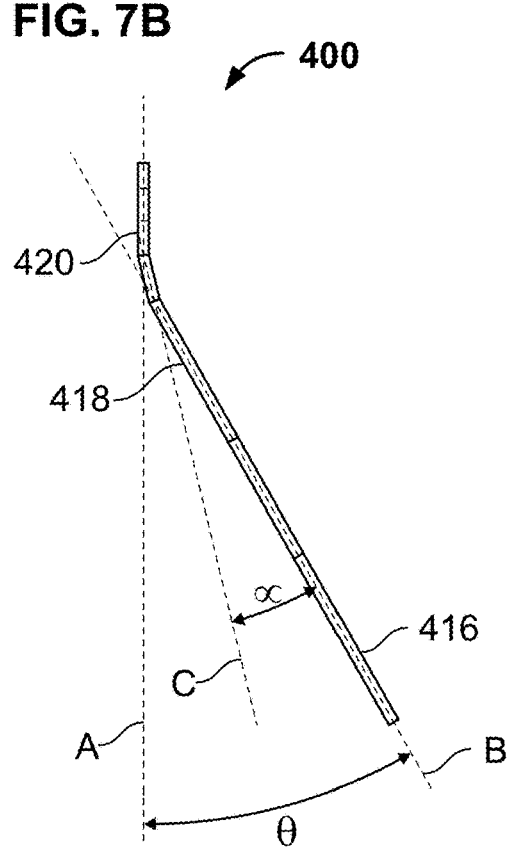
FIG. 7B shows a side view of the agricultural machine attachment of FIG. 7A.
Figure 9:
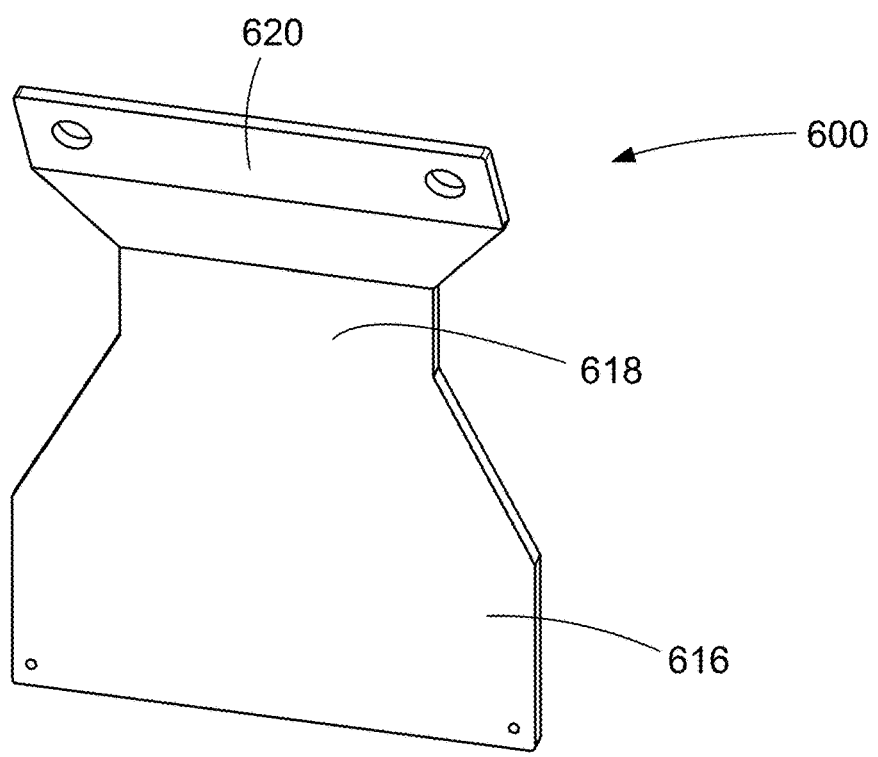
FIG. 9 shows a perspective view of an agricultural machine attachment, according to one embodiment of the present disclosure.
Figure 10:
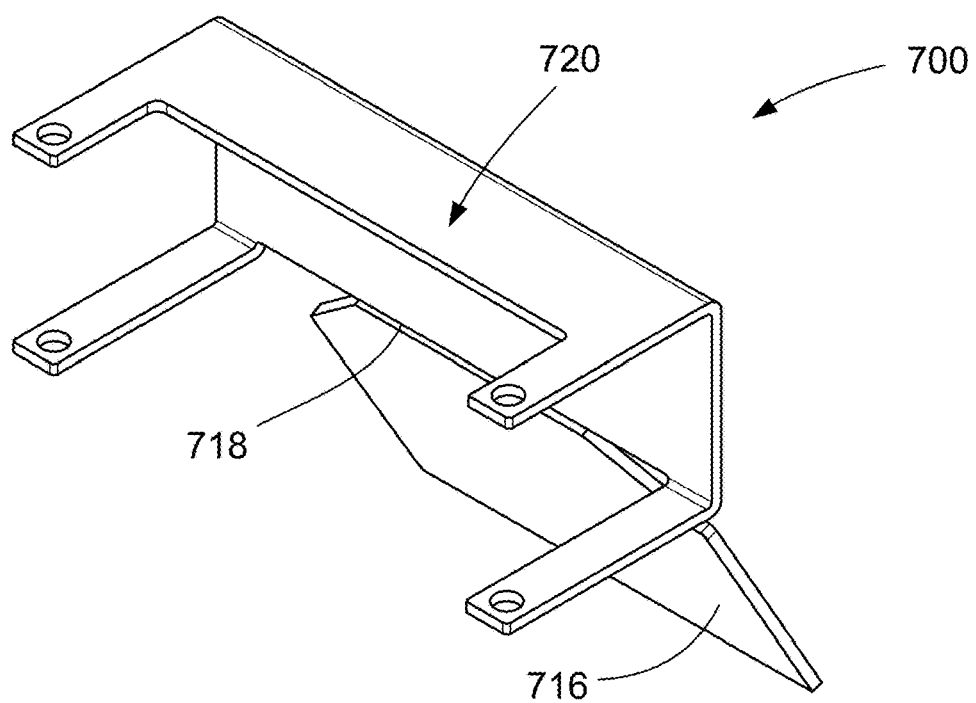
FIG. 10 shows a perspective view of an agricultural machine attachment, according to one embodiment of the present disclosure.
Figure 11:
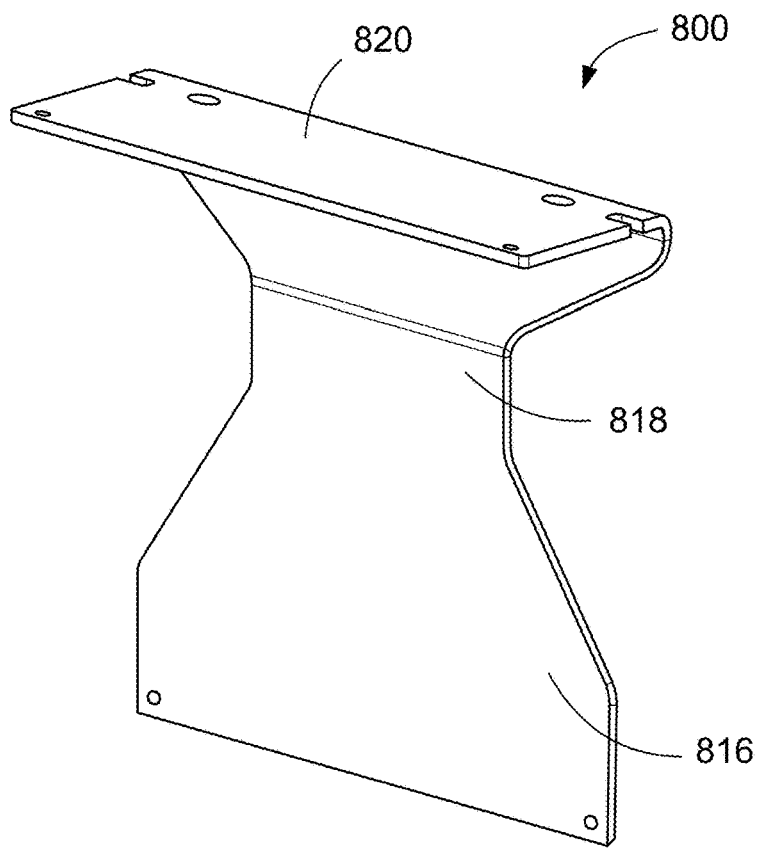
FIG. 11 shows a perspective view of an agricultural machine attachment, according to one embodiment of the present disclosure.
Figure 12:
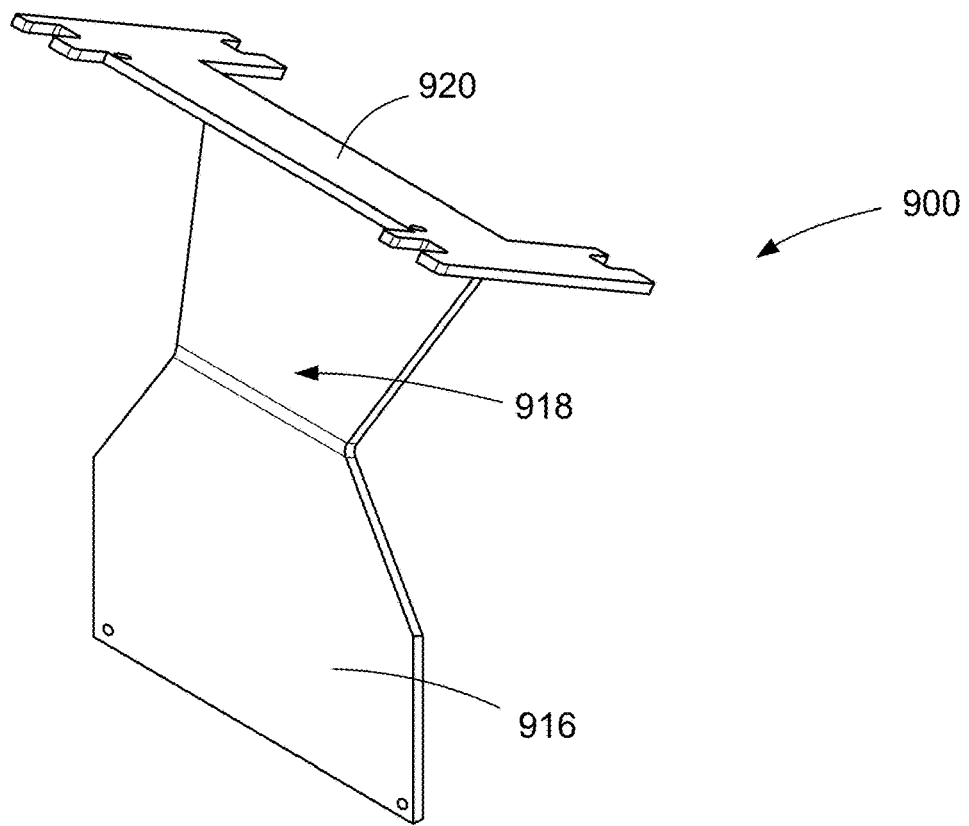
FIG. 12 shows a perspective view of an agricultural machine attachment, according to one embodiment of the present disclosure.
Figure 13:
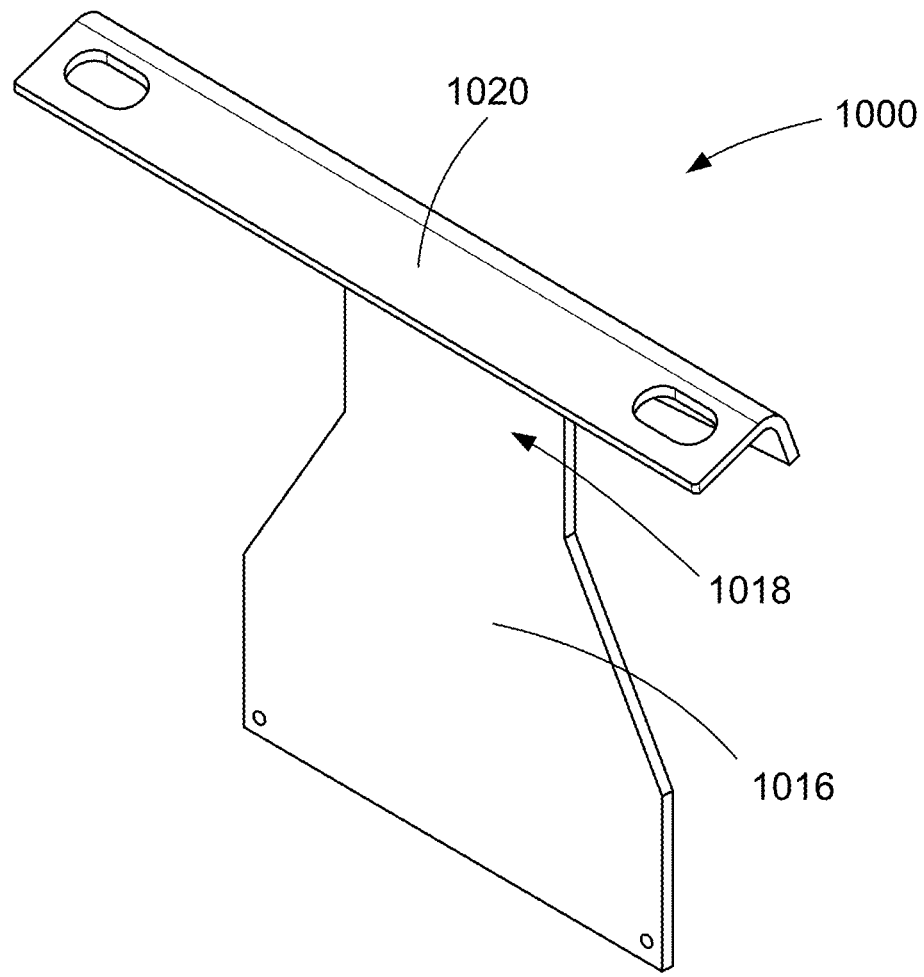
FIG. 13 shows a perspective view of an agricultural machine attachment, according to one embodiment of the present disclosure.
Figure 14A:
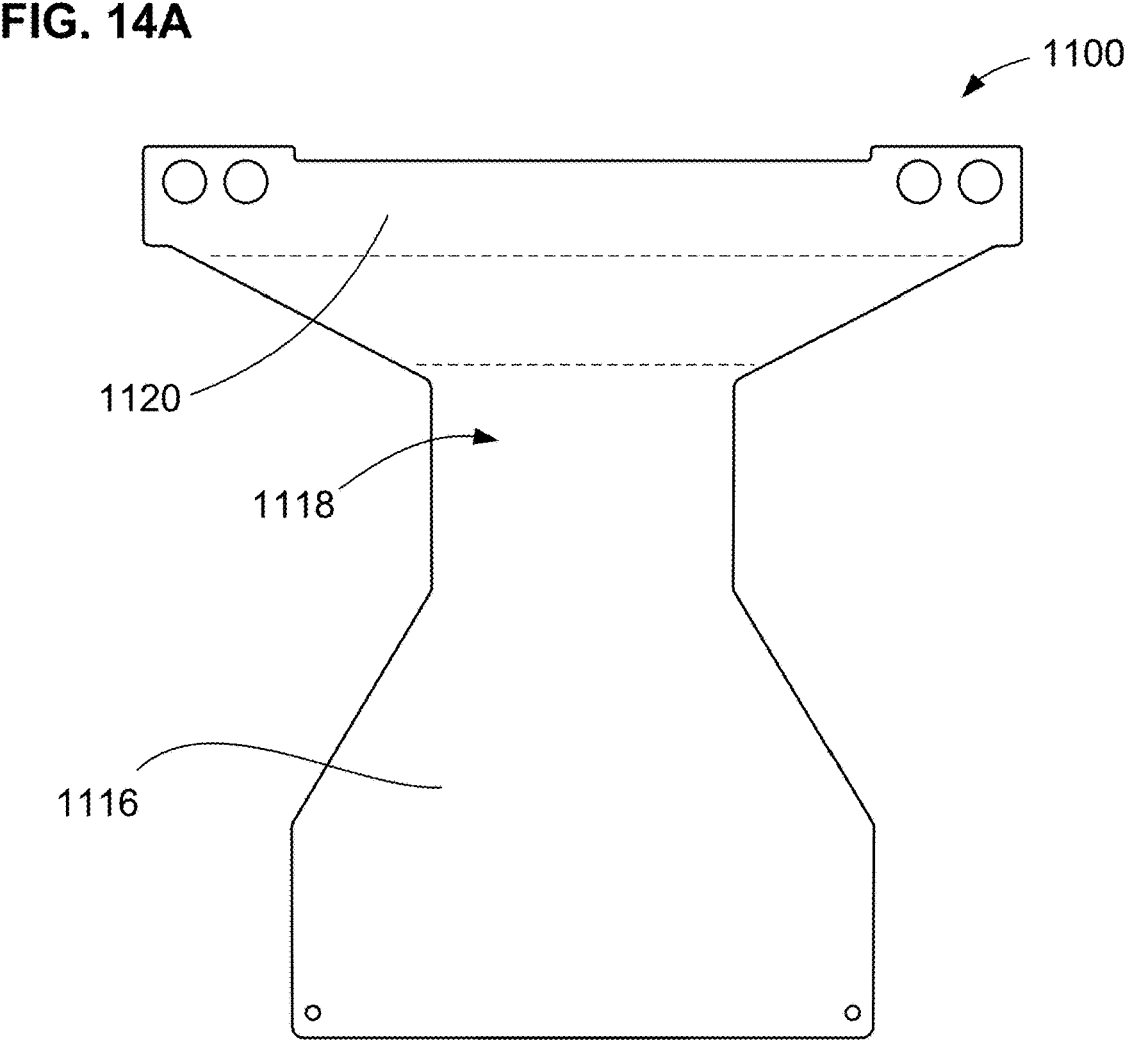
FIG. 14A shows a front view of an agricultural machine attachment, according to one embodiment of the present disclosure.
Figure 14B:
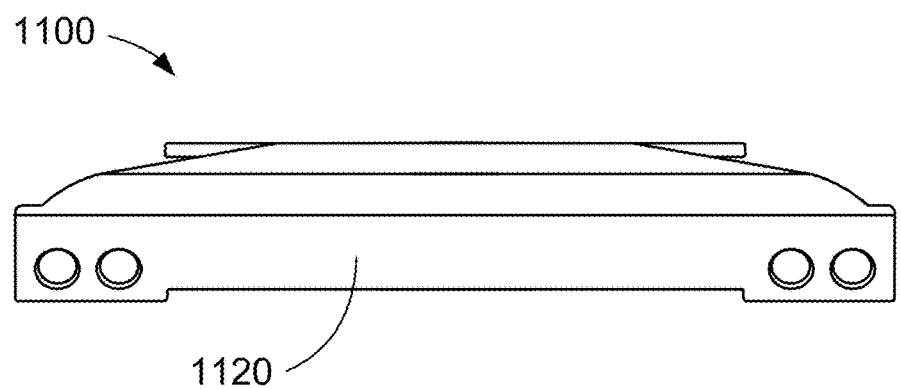
FIG. 14B shows a top view of the agricultural machine attachment of FIG. 14A.
Figure 15:
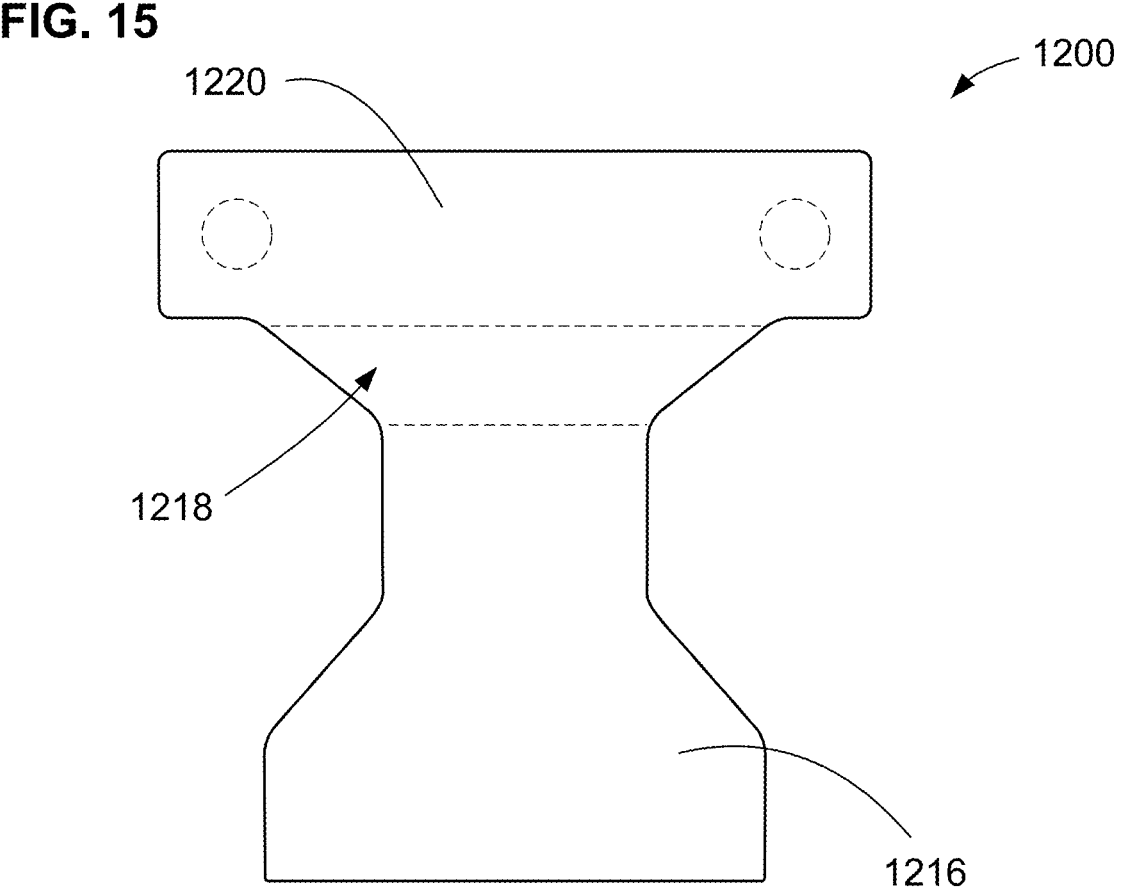
FIG. 15 shows a front view of an agricultural machine attachment, according to one embodiment of the present disclosure.
Figure 16:
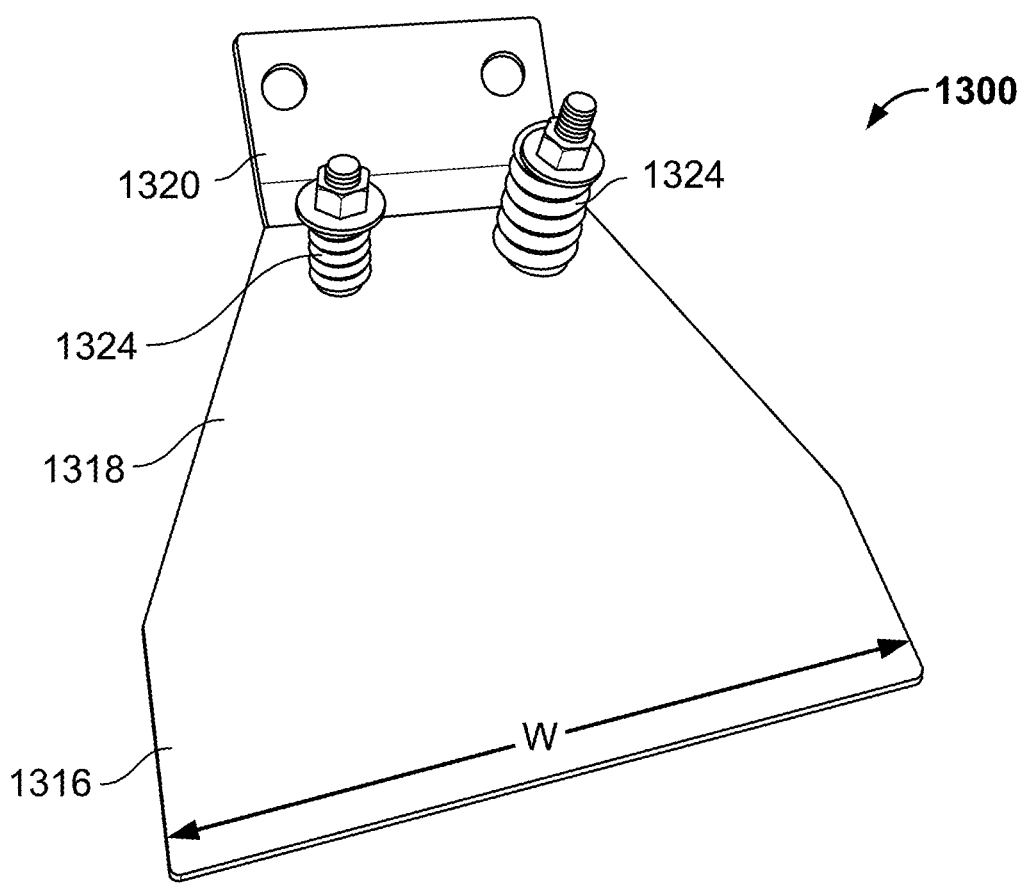
FIG. 16 shows a perspective view of an agricultural machine attachment, according to one embodiment of the present disclosure.
Figure 17:
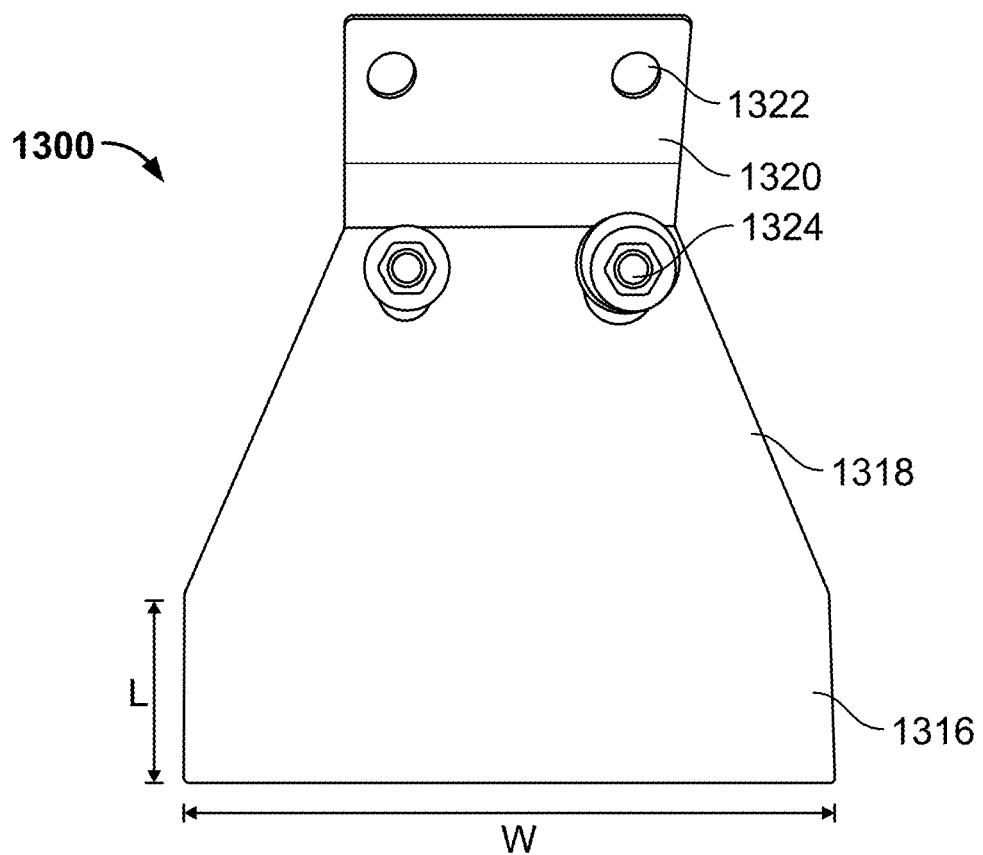
FIG. 17 shows a back view of the agricultural machine attachment of FIG. 16.
Figure 18:
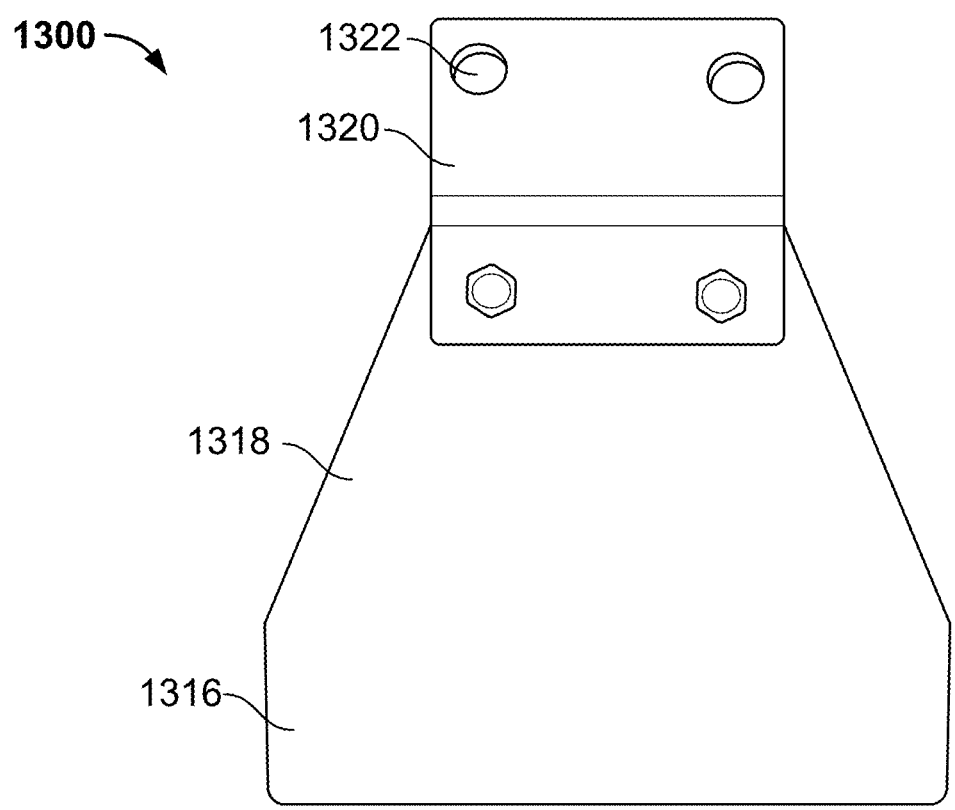
FIG. 18 shows a front view of the agricultural machine attachment of FIG. 16.
Figure 19:
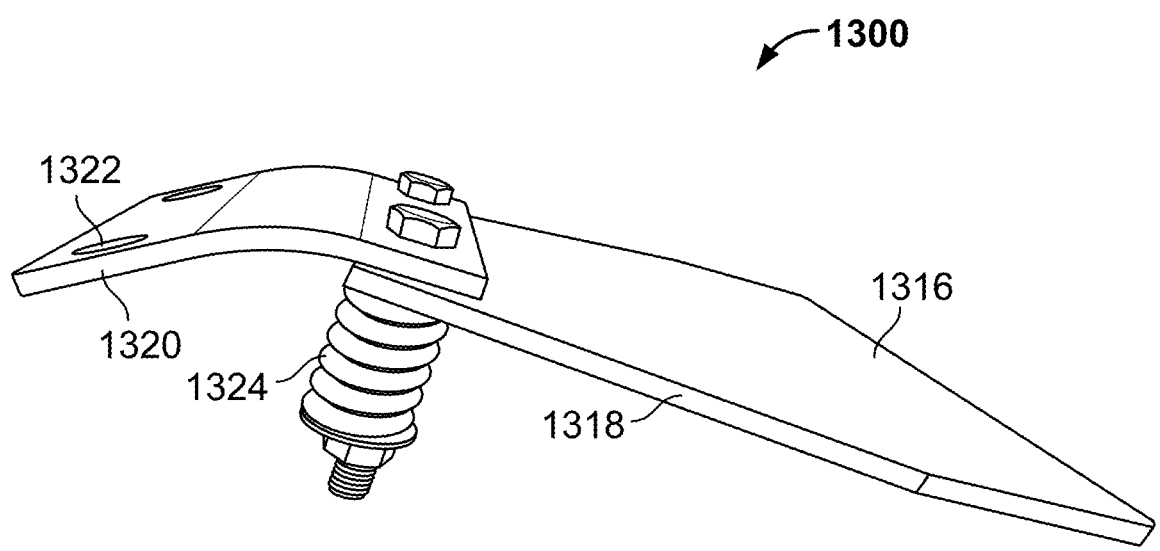
FIG. 19 shows a side view of the agricultural machine attachment of FIG. 16.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The agricultural machine attachment disclosed herein has a plurality of advantages. The attachment attaches to a harvesting head of a combine and functions to flatten, or knock over, corn stalks that remain after harvest (i.e. after the cornstalks have been partially severed by the combine). This function saves on tire and equipment wear by omitting other operations in the field that would be necessary to remove the remaining stalks prior to working the field again. In addition, the small size of the attachment allows it to remain on the harvesting head of a combine unmodified when the harvesting head is decoupled from the combine and loaded onto a trailer for transport. Further still, the attachment floats above the ground during operation of the combine. Such an arrangement eliminates the need for a complex arrangement where the attachment rides on and over the uneven ground to knock over the corn stalks. Further still, by contacting the corn stalk at a point above the ground, improved decomposition of the corn stalk during the winter can be achieved.

FIG. 1 shows an agricultural machine attachment 100 attached to a toolbar 102 of a harvesting head 104 of a combine 106. During operation, as the combine 106 encounters corn 108, which is aligned in rows 109, the combine head 106 reduces the corn 108 to a shortened corn stalk 110. Each corn stalk 110 in each row 109 is then contacted by the attachment 100 to uproot, knock, and flatten the corn stalk 110a over before a tire 112 of the combine 106 encounters the corn stalk 110. In some examples, a plurality of attachments 100 can be attached to the toolbar 102. In some examples, a single attachment can be attached to the toolbar 102 to correspond with each row 109 of corn the harvesting head 104 encounters. In other examples, a pair of attachments 100 can be attached to the toolbar 102 at positions in front of the tires 112 to prevent damage to the tires 112.

In some examples, during normal operation, the attachment 100 does not contact a ground surface 114. This prevents the attachment 100 from dragging on the ground 114, thereby requiring additional power from the combine 106 or additional components that would unnecessarily complicate the attachment 100. Floating above the ground 114 also prevents the attachment 100 from inadvertently striking an object (e.g., a rock) and becoming stuck, which could potentially damage both the attachment 100 and the harvesting head 104. Further, contacting the corn stalk 110 at a point above the ground surface 114 allows the corn stalk 110 to be more easily knocked over via a lever action. In some examples, by knocking over the corn stalk 110 so that it lies on top of the ground surface 114, rather than burying the corn stalk 110 under the ground surface 114, provides advantages in the decomposition process after harvest. In other examples, the attachment 100 is positioned to contact only the ground surface 114 without digging into the ground 114.

In some examples, the attachment 100 is positioned above a lowest portion 105 of the harvesting head 104. This facilitates the loading of the harvesting head 104 onto a trailer without damaging the attachment 100. Further, the attachment 100 does not require modification before the harvesting head 104 is loaded onto a trailer. This is more convenient for the operator while also preventing the attachments 100 from being accidently damaged. Further, by being positioned above the lowest portion 105 of the harvesting head 104, the attachments 100 are less likely to become stuck in the ground because the lowest portion 105 of the harvesting head 104 operates as a guide. For example, if an undulation in the ground 114 is encountered, the lowest portion 105 of the harvesting head 104 will contact the ground first, thereby alerting the operator instead of the operator having to be aware of the height of the attachment 100 with respect to the harvesting head 104 (i.e. if the attachment 100 is closer to the ground than the lowest portion 105).

FIGS. 2-4B show the attachment 100 removed from the harvesting head 104. The attachment 100 includes a main body 116, an optional neck portion 118, and a flange 120. In some examples, the attachment 100 can be constructed from metal, such as steel. In some examples, the main body 116, neck 118, and flange are all rigidly fixed to one another. In some examples, the attachment 100 can be manufactured from a piece of ¼ inch mild rolled steel. In some examples, the attachment 100 measures 5⅕ inches wide at the flange 120 extending down 3¼ inches to the neck portion 118, 218.

In other examples, the attachment 100 can be molded from a plastic such as ABS or PVC. In some examples, the attachment 100 can have an elastic quality allowing the attachment to flex without breaking. In some examples, the attachment 100 can be manufactured from a single piece of material. In other examples, the attachment 100 can be manufactured from a plurality of materials. In some examples, the main body 116 can be manufactured from a different material than the flange 120.

The main body 116 is connected to the neck portion 118 and the flange 120. The main body 116 of the attachment 100 is configured to contact the corn stalks 110 at one side. In some examples, the main body 116 is the widest portion of the attachment 100. In other examples, the main body 116 can be at least partially flexible. The neck portion 118 tapers from a width W of the main body 116 to the width of the flange 120. In some examples the neck has a minimum width that is less than the minimum width of the main body. In some examples, the neck 118 has a minimum width between 5.0 inches and 6.0 inches. In some examples, the neck 118 has a minimum width of about 5.5 inches.

The flange 120 is configured to be mounted to the tool bar 102 of the harvesting head 104. In some examples, the flange 120 can include at least one mounting aperture 122 to receive a fastener to attach the flange 120 to the toolbar 102. In other examples, the flange 120 can be welded to the toolbar 102. In other examples still, the flange 120 is connected to the tool bar 102 of the harvesting head 104 via a fastener such as a bolt, collar, or the like.

In some examples, the main body 116 is angled in a way to be positioned in a swept back position when mounted on the toolbar 102 of the harvesting head 104. This allows the attachment 100 to glide over the corn stalks 110, or other obstacles, during the flattening process to aid in preventing the attachment 100 from becoming stuck or potentially causing damage to the harvesting head 104.

In some examples, if the attachment 100 becomes accidently deformed or bent, the attachment 100 is configured in a way so as to bend at the neck 118. Therefore, a user can easily bend back the main body 116 into a swept back configuration without needing to replace the attachment 100 nor possess any specialty tools/knowledge. In some examples, this bending at the neck 118 is facilitated by the smaller minimum width of the neck 118 as compared to the minimum width of the main body 116. In some examples, the bending at the neck 118 is facilitated by the fact that the neck 118 already angles with main body 116 with the flange 120.

The flange 120 can be configured in a variety of ways to achieve proper mounting to the toolbar 102 while maintaining the general swept back position of the main body 116 with respect to the harvesting head 104 after the attachment 100 is mounted.

In some examples, the flange 120 defines a plane A that is transverse with a plane B, defined at least partially by the main body 116, and in some examples, the neck portion 118. In some examples, plane A and plane B are angled with one another at an angle $\theta$. In some examples, the neck portion 118 defines a plane C that forms an angle $\alpha$ with the main body 116.

In some examples, the angle $\theta$ can be between about 120 degrees and 10 degrees. In some examples, the angle $\theta$ is between about 40 degrees and 10 degrees. In some examples, the angle $\theta$ is between about 30 degrees and 15 degrees. In some examples, the angle $\theta$ is 120 degrees. In some examples, the angle $\theta$ is 80 degrees. In some examples, the angle $\theta$ is 30 degrees. In some examples, the angle $\theta$ is 25 degrees.

A width W (shown schematically in FIG. 4A) of the main body 116 can be about 10¼ inches on both sides and a length L of the main body 116 can be between about 3 inches and 6½ inches. In some examples, the width W of the main body is between about 9 inches and 12 inches.

In some examples, the mounting apertures 122 are positioned down 1 inch from the top of the flange 120 and 3 and 13/16 inches on the center side of the flange 120. In some examples, the flange 120 can have a width of 5½ inch. Different harvesting heads 104 and toolbars 102 require different mounting apertures 122 and the attachments 100 can maintain the same swept, bent configuration with a variety of different flange configurations, while also maintaining the same width W of between 10 inches and 10¼ inch at the bottom of the main body 116.

As mentioned above, the attachment 100 can be generally flexible. In some examples, the attachment 100 is rigid and inflexible. In some examples, the attachment 100 can utilize a flexible material. In some examples, the main body 116 can be constructed of a flexible material while the flange 120 is manufactured from a rigid metal. In other examples, the entire attachment 100 can be manufactured from a flexible material.

Other example embodiments of an attachment are shown in FIGS. 5A-15. For example, attachments 200, 300, 400, 500, 600, 700, 800, 900, 1000, 1100, 1200 and 1300 operate in substantially similar manner as the attachment 100, described above. The numbering for the attachments 200, 300, 400, 500, 600, 700, 800, 900, 1000, 1100, and 1200 will be in the 200, 300, 400, 500, 600, 700, 800, 900, 1000, 1100, and 1200 series, respectively, where like parts will have similar numbers as attachment 100, unless indicated to the contrary. Specifically, a main body 216/316/416/516/616/716/816/916/1016/1116/1216; a neck portion 218/318/418/518/618/718/818/918/1018/1118/1218; a flange 220/320/420/520/620/720/820/920/1020/1120/1220; and a mounting aperture 1332 are shown in FIGS. 5A-19.

The attachments 200, 300, 400, 500, 600, 700, 800, 900, 1000, 1100, and 1200 can be configured in a variety of ways to be attachable to particular arrangements of different toolbars 102 on different harvesting heads 104. Therefore, in order to allow for mounting to a variety of different harvesting heads 104, a flange 220, 320, 420, 520, 620, 720, 820, 920, 1020, 1120, and 1220 of the attachments 200, 300, 400, 500, 600, 700, 800, 900, 1000, 1100, and 1200 can be configured in a variety of different ways to allow for the attachment to be swept back and floating above the ground.

In some examples, a main body (such as main body 216 in FIG. 5A) of the attachment is wider than a neck portion but less wide than the flange. (See FIGS. 5A 8A, and 15).

In some examples, the angle $\theta$ can be about 90 degrees with the angle $\alpha$. In some examples, the angle $\alpha$ can be between about 10 degrees and 30 degrees. In some examples, the angle $\alpha$ can be between about 15 degrees and 20 degrees. In some examples, the angle $\alpha$ can be 15 degrees. In some examples, the angle $\alpha$ can be 20 degrees.

As shown in FIGS. 16-19, an attachment 1300 is shown according to another example of the present disclosure. The attachment 1300 is substantially similar to the other attachments described herein. The attachment 1300 can include a biasing member 1324 (e.g., a spring, damper, actuator, etc.) to allow the attachment 1300 to flex under a load. In some examples, the biasing member 1324 biases the attachment 1300 to a swept back position when mounted to a toolbar 102. The biasing member 1324 can be positioned between the attachment 1300 and the toolbar 102. If an obstacle is encountered, the attachment 1300, specifically a main body 1316, can compress the biasing member 1324 to allow the attachment 1300 to move upward toward the toolbar 102 until the attachment 1300 no longer encounters the obstacle. Once the obstacle has passed, the biasing member 1324 can return the attachment 1300 to the swept back position.

As shown, the main body 1316 and a flange 1320 are two separate pieces connected by fasteners 1326. Further, in some examples, the attachment 1300 itself can have an arcuate shape. In other examples, the flange 1320 can have an arcuate shape.

Figure 20:
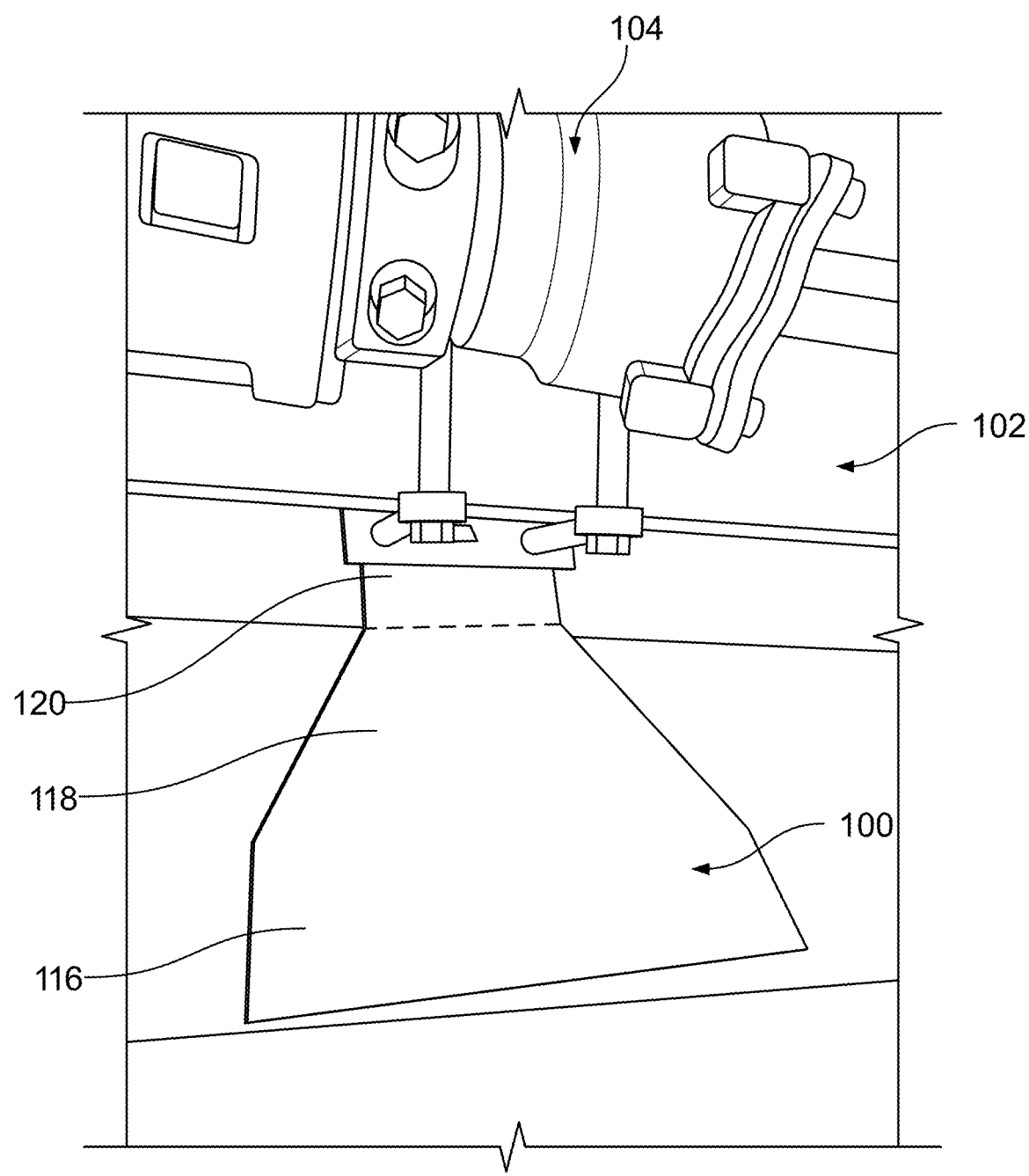
FIG. 20 shows a perspective view of an agricultural machine attachment mounted to a toolbar of a combine, according to one embodiment of the present disclosure.
Figure 21:
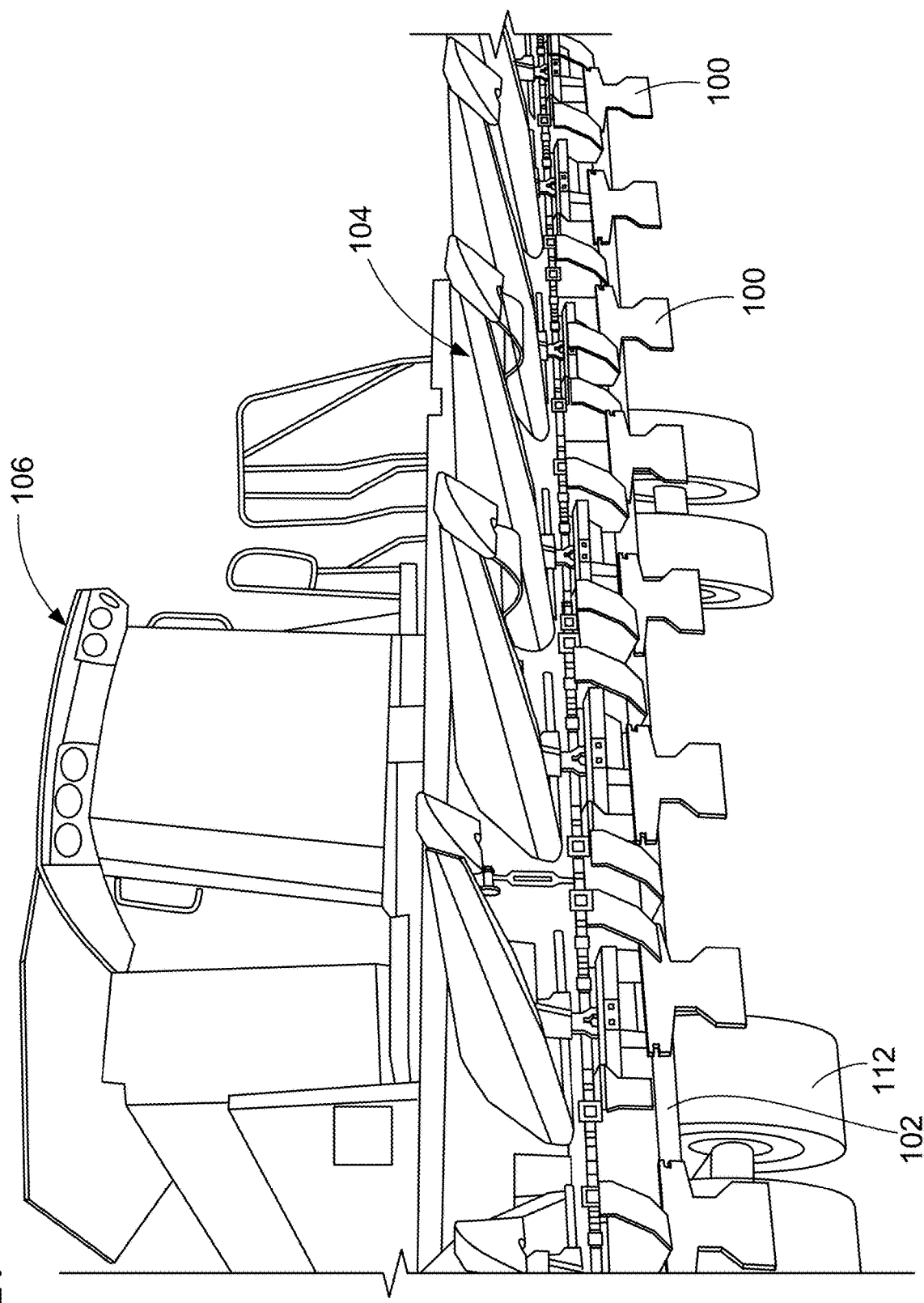
FIG. 21 shows a perspective view of a combine with an agricultural machine attachment, according to one embodiment of the present disclosure.
Figure 22:
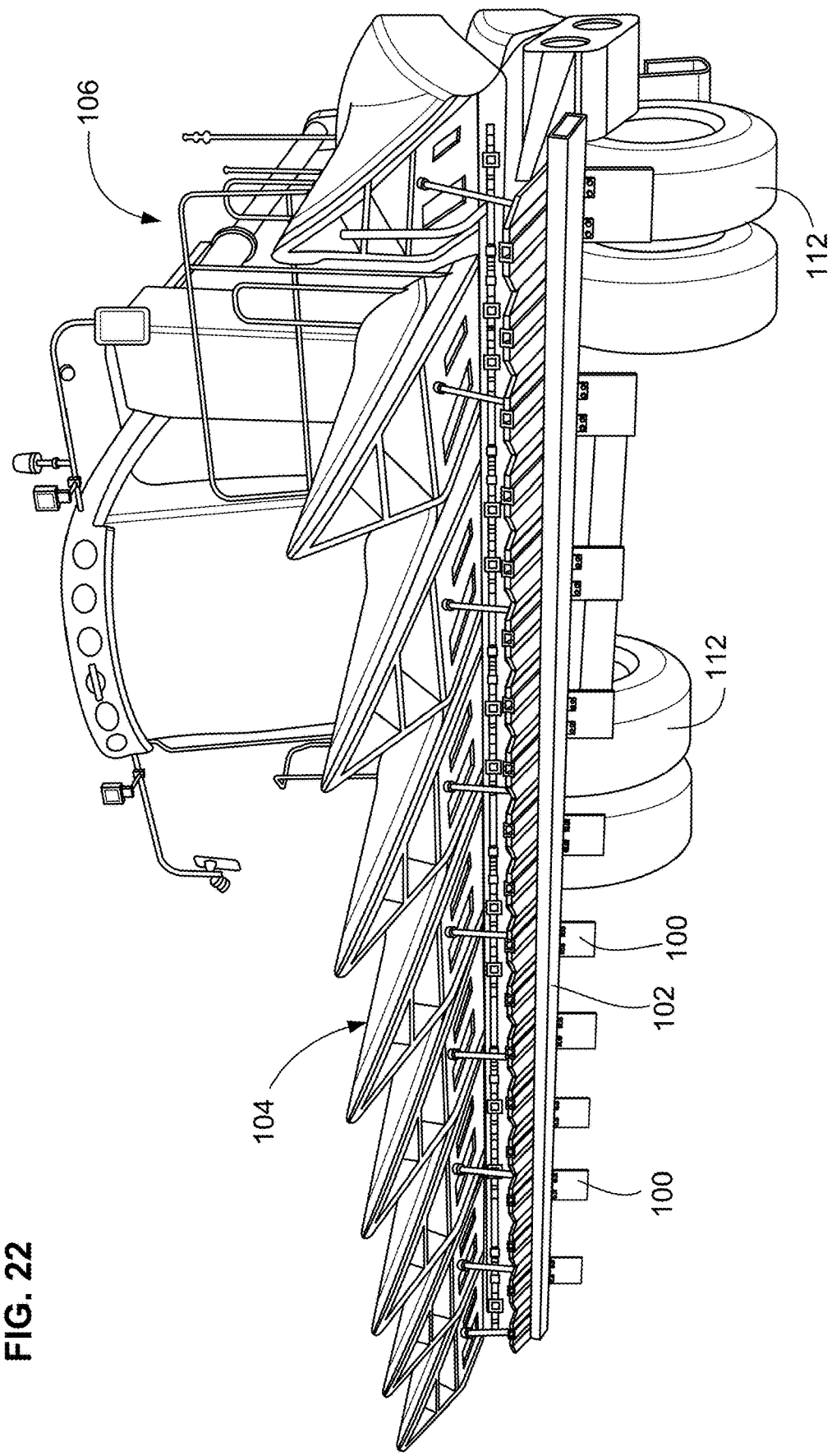
FIG. 22 shows a perspective view of a combine with an agricultural machine attachment, according to one embodiment of the present disclosure.

FIGS. 20-22 show the attachment 100 mounted to the toolbar 102 of the harvesting head 104. As shown, the toolbar 102 is positioned under the harvesting head 104 of the combine 106. When the combine 106 is harvesting corn during a harvesting operation, the head 104 is rotated downwardly so that the front end is tilted downward toward the ground. This arrangement facilitates the floating of the attachment 100 above the ground when harvesting is performed.

Figure 23:
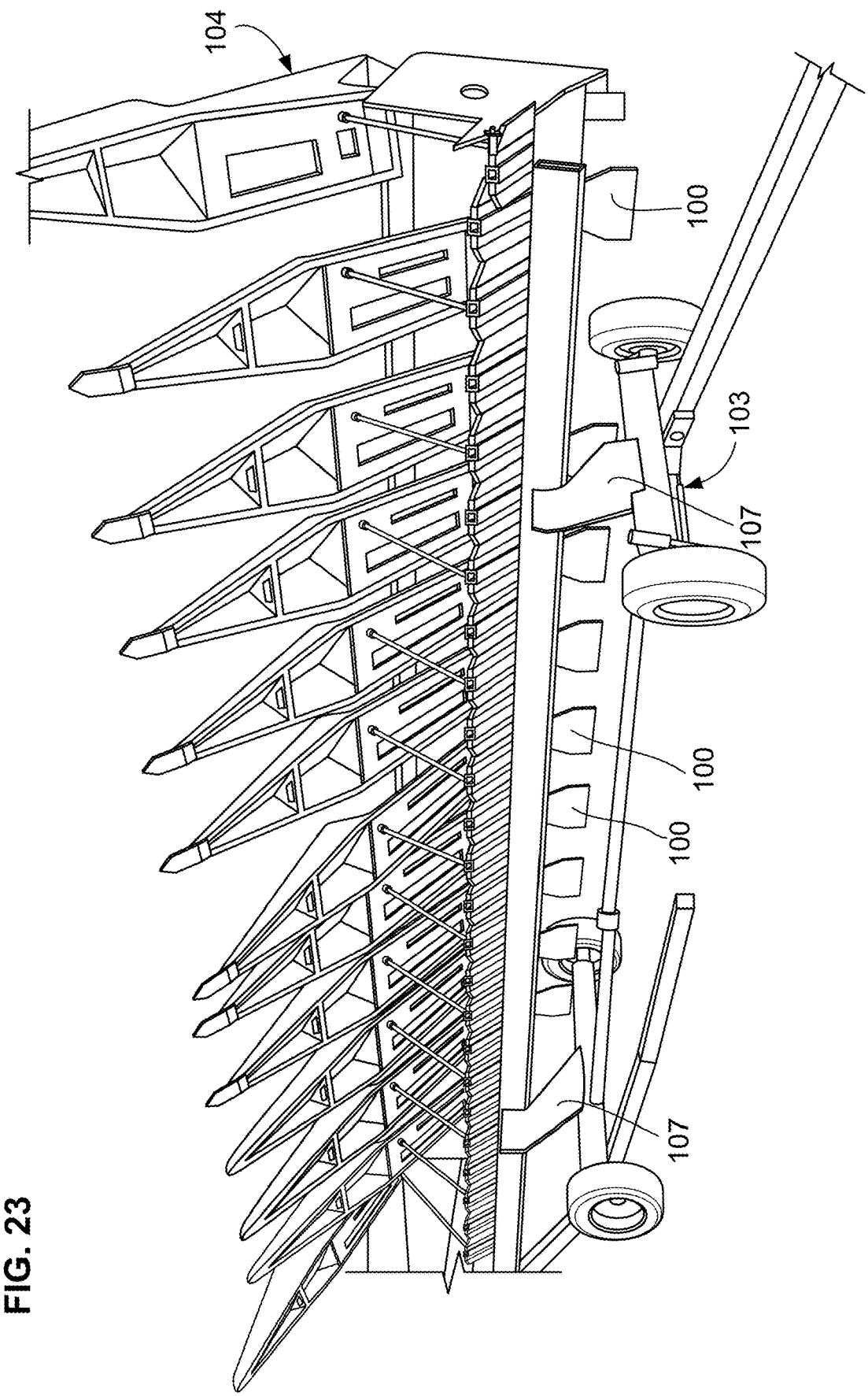
FIG. 23 shows a perspective view of a harvesting head of a combine stored on a trailer, according to one embodiment of the present disclosure.

FIG. 23 shows the harvesting head 104 decoupled from the combine 106 and resting on supports 107 of a trailer 103. As shown, the attachments 100 remain attached and unmodified to the toolbar 102 of the harvesting head 106. By not having to modify the position of the attachments 100 with respect the to the harvesting head 104, the overall process of decoupling the head from the combine 106 and loading the harvesting head 104 onto the trailer 103 is unencumbered and straightforward for the user. Further, the user does not need to spend time modifying the position of the attachments both when the head 104 is loaded onto the trailer 103 and when the head 104 is again coupled with the combine 104.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

We claim:

1. A harvesting head of a combine comprising:
a toolbar affixed to the harvesting head of the combine at a position rearward of a frontmost point defined by the harvesting head and forward of all of the tires of the combine;
a plurality of attachments separately attached in a row to the toolbar of the harvesting head of the combine, wherein each attachment of the plurality of attachments is separately and independently removable from the toolbar, wherein each attachment comprises:
a main body;
a flange fixedly connected between the main body and the toolbar, wherein the main body extends away from the flange, wherein a portion of the main body increases in a width as it extends from the flange, the flange having at least one mounting aperture, the flange being configured to be attached to the harvesting head of the combine by the at least one mounting aperture; and
a fastener configured to be received by the at least one mounting aperture of the flange, wherein, when received by the at least one mounting aperture, the fastener fixedly positions the flange against the toolbar, and wherein the main body is fixed to the combine only at the flange without the use of an auxiliary connection structure,
wherein, when the flange is attached to the harvesting head of the combine, and the combine is performing a harvesting operation, the at least one mounting aperture and the fastener prohibit relative movement between the toolbar and the flange.

2. The harvesting head of claim 1, wherein when mounted to the harvesting head, the main body is angled away from a direction of forward travel of the harvesting head.

3. The harvesting head of claim 1, wherein the portion of the main body is a neck positioned between the main body and the flange, wherein the main body is wider than the neck.

4. The harvesting head of claim 3, wherein the neck tapers to the width of the main body.

5. The harvesting head of claim 3, wherein the neck has a minimum width between 5.0 inches and 6.0 inches.

6. The harvesting head of claim 3, wherein the neck has a minimum width of about 5.5 inches.

7. The harvesting head of claim 1, wherein the main body has a minimum width between 9 inches and 12 inches.

8. An attachment assembly of a harvesting head of a combine comprising:
a plurality of separate attachments configured for attachment to the harvesting head of the combine in a row, wherein each attachment of the plurality of attachments is separately and independently removable from the harvesting head of the combine, wherein, when attached, the plurality of separate attachments are configured to be positioned rearward of a frontmost point defined by the harvesting head and forward of all of the tires of the combine, wherein each attachment comprises:
a main body having a minimum width, the main body being configured to contact a corn stalk at a first side, the main body being formed from an elastic material, wherein the elastic material is configured to return the main body to a resting position after a deflecting force is removed from the main body;
a flange connected to the main body via a neck, wherein the flange, neck, and main body are all in a fixed relationship, wherein the neck has a minimum width that is less than the minimum width of the main body and wherein the neck tapers to the width of the main body, wherein the neck and the main body extend away from the flange, wherein the neck has a minimum width between 5.0 inches and 6.0 inches;
at least one mounting aperture defined by the flange, the at least one mounting aperture being configured to mount each attachment to the harvesting head of the combine; and
a fastener configured to be received by the at least one mounting aperture of the flange, wherein, when received by the at least one mounting aperture, the fastener fixedly positions the flange against a toolbar of the harvesting head of the combine, thereby prohibiting relative movement between the flange and the toolbar, and wherein the main body is fixable to the combine only at the flange without the use of an auxiliary connection structure.

9. The attachment assembly of claim 8, wherein the neck has a minimum width of about 5.5 inches.

10. The attachment assembly of claim 8, wherein, when the flange is attached to the harvesting head of the combine and the combine is performing a harvesting operation, a furthest portion of the main body away from the flange is positioned above a lowest portion of the harvesting head from a ground surface.

11. The attachment assembly of claim 8, wherein when mounted to the harvesting head, the main body is angled away from the direction of forward travel of the harvesting head.

12. The attachment assembly of claim 8, wherein the minimum width of the main body is between 9 inches and 12 inches.

13. A method of operating a harvesting head of a combine, the method comprising:
   providing a plurality of separate attachments in a row on a toolbar attached to the harvesting head of the combine, wherein each attachment of the plurality of attachments is separately and independently removable from the toolbar, wherein the toolbar is positioned rearward of a frontmost point defined by the harvesting head and forward of all of the tires of the combine, wherein each of the attachments includes:
      a main body having a minimum width and a terminal end spaced away from the toolbar; and
      a flange connected to the main body, opposite the terminal end, via a neck, wherein the flange, neck, and main body are in a fixed relationship;
      wherein the neck has a minimum width that is less than the minimum width of the main body and wherein the neck tapers to the width of the main body, wherein the taper extends away from the flange longitudinally with respect to the main body, the flange having at least one mounting aperture, the flange being configured to be attached to the toolbar of the harvesting head of the combine; and
      a fastener configured to be received by the at least one mounting aperture of the flange, wherein, when received by the at least one mounting aperture, the fastener fixedly positions the flange against the toolbar, thereby prohibiting relative movement between the flange and toolbar, and wherein the main body is fixed to the combine only at the flange without the use of an auxiliary connection structure;
   operating the harvesting head of the combine in a harvesting operation in a direction of forward travel, wherein the harvesting head of the combine encounters crop before the tires of the combine and wherein the main body of each of the plurality of attachments is floated above a ground surface during the harvesting operation; and
   contacting, at least partially, a severed corn stalk with the terminal end of the main body of at least one of the plurality of attachments during the harvesting operation of the harvesting head, wherein the terminal end of the main body contacts the severed corn stalk at a point above the ground surface.

14. The method of claim 13, wherein the neck has a minimum width between 5.0 inches and 6.0 inches.

15. The method of claim 13, wherein the neck has a minimum width of about 5.5 inches.

16. The method of claim 13, wherein the plurality of attachments are angled away from the direction of forward travel of the harvesting head.

17. The method of claim 13, further comprising decoupling the harvesting head from the combine and loading the harvesting head onto a trailer, wherein the plurality of attachments do not contact the trailer.

18. The method of claim 17, wherein the position of each of the plurality of attachments with respect to the harvesting head is not modified prior to loading the harvesting head onto the trailer.

19. The harvesting head of claim 1, wherein the main body is formed from an elastic material, wherein the elastic material is configured to return the main body to a resting position after a deflecting force is removed from the main body.

20. The method of claim 13, wherein the main body is formed from an elastic material, wherein the elastic material is configured to return the main body to a resting position after a deflecting force is removed from the main body.

* * * * *